Mar. 3, 1925.  
L. WILKINSON  
DRAW WORKS  
Filed March 17, 1924  
1,528,139  
7 Sheets-Sheet 1

Inventor  
Lee Wilkinson

By Hardway & Carthy  
Attorneys

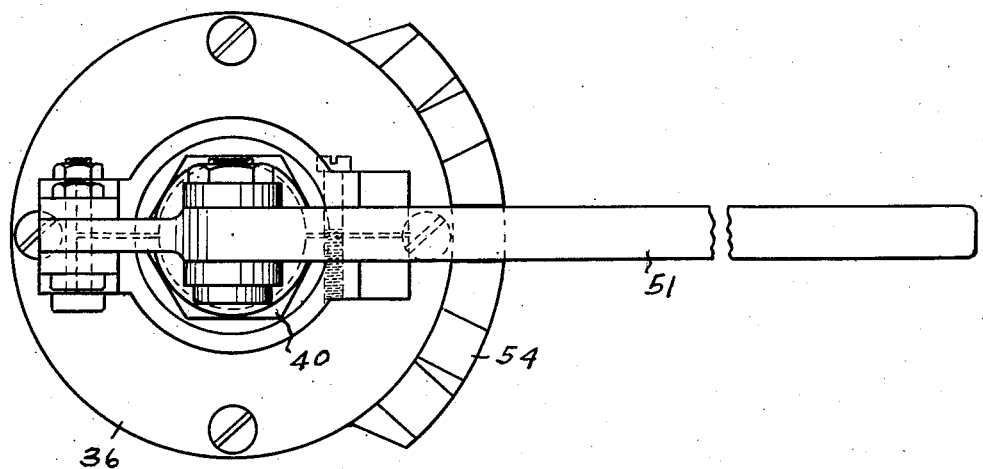
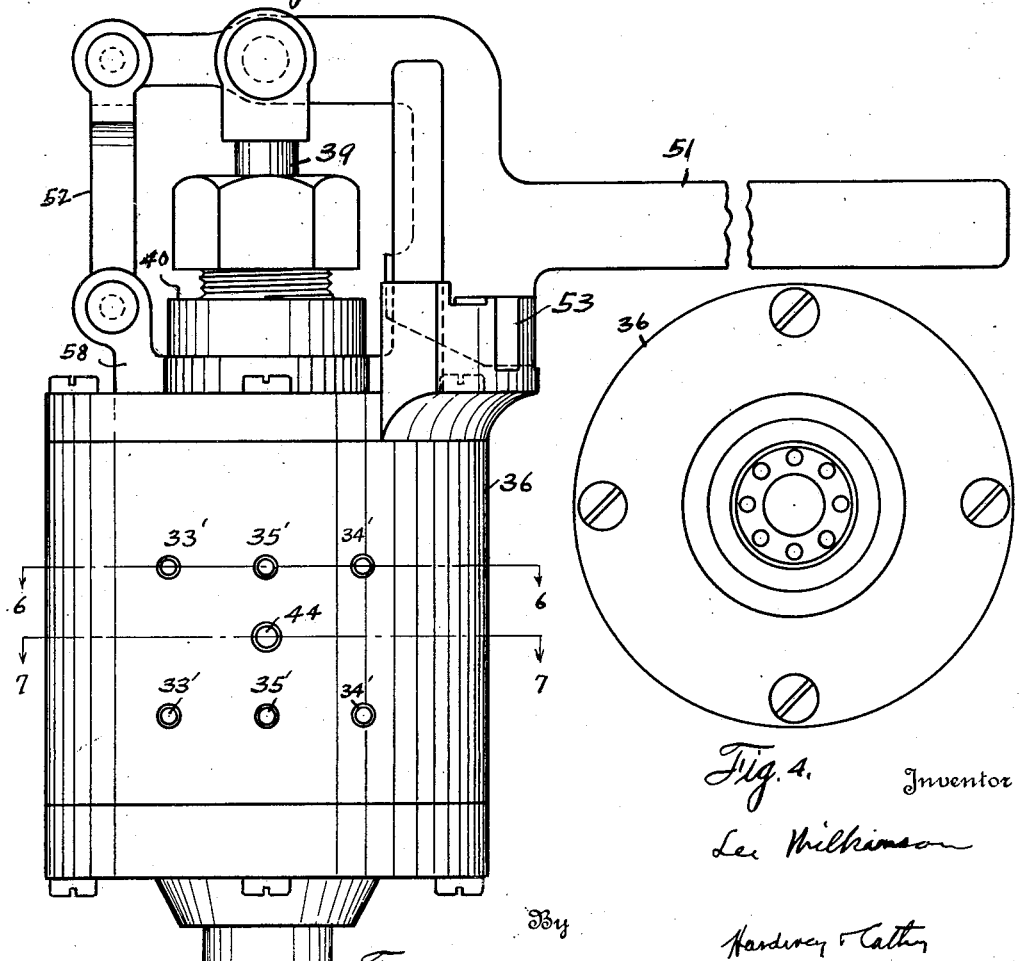

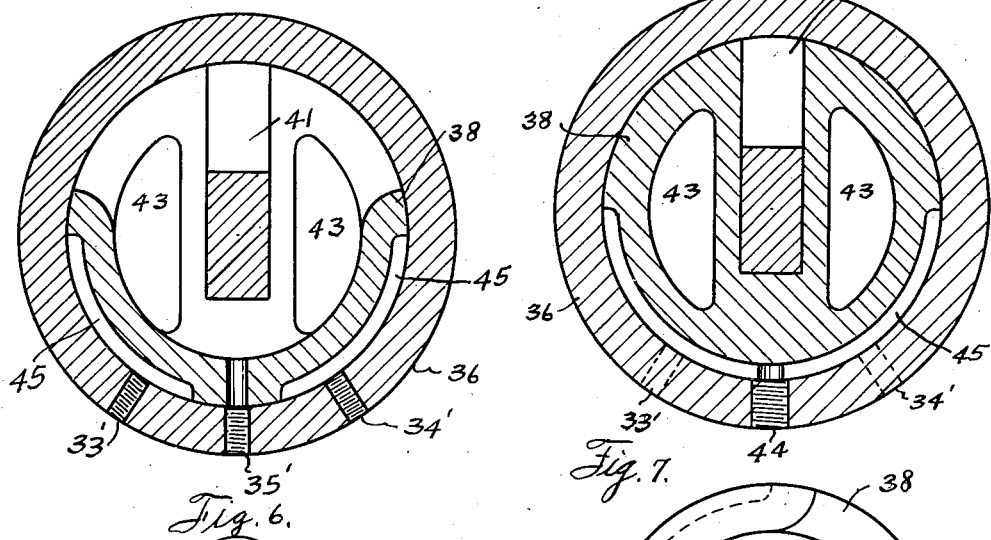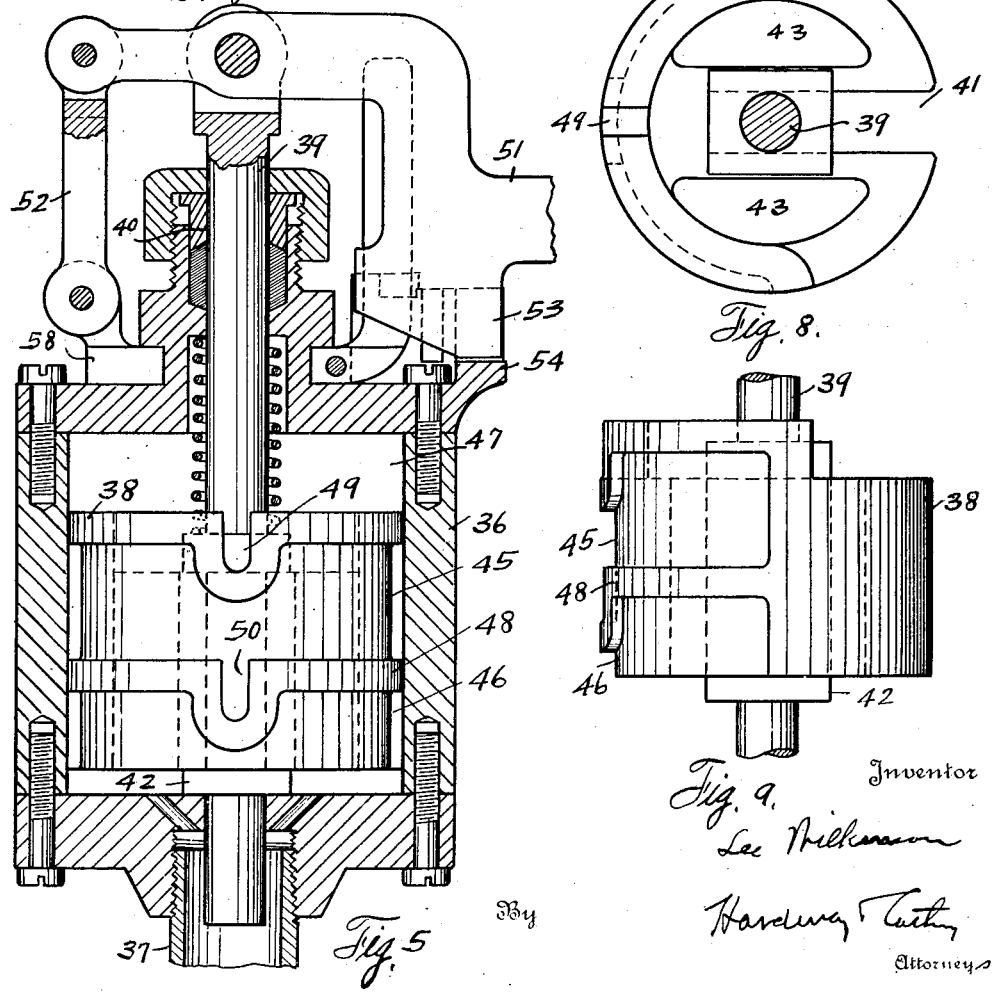

Mar. 3, 1925.　　　　　　　L. WILKINSON　　　　　1,528,139
DRAW WORKS
Filed March 17, 1924　　　7 Sheets-Sheet 4
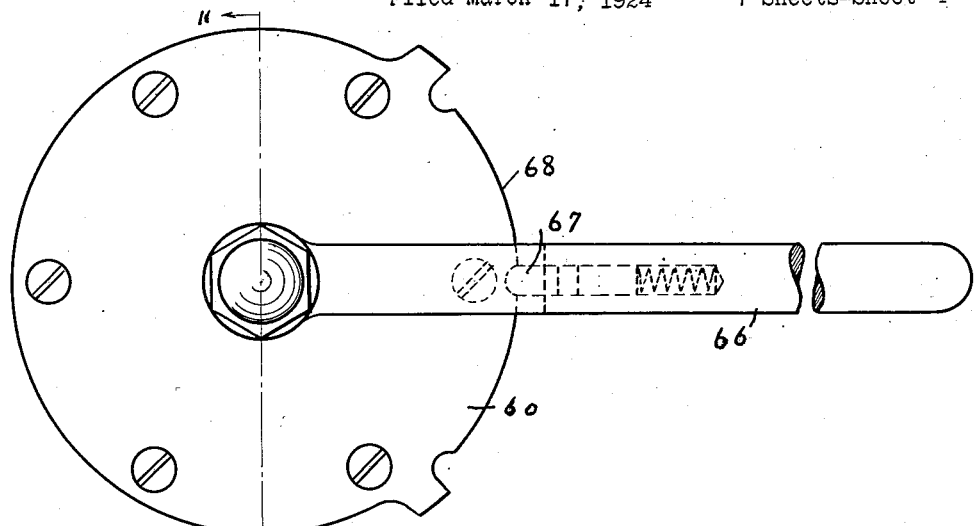
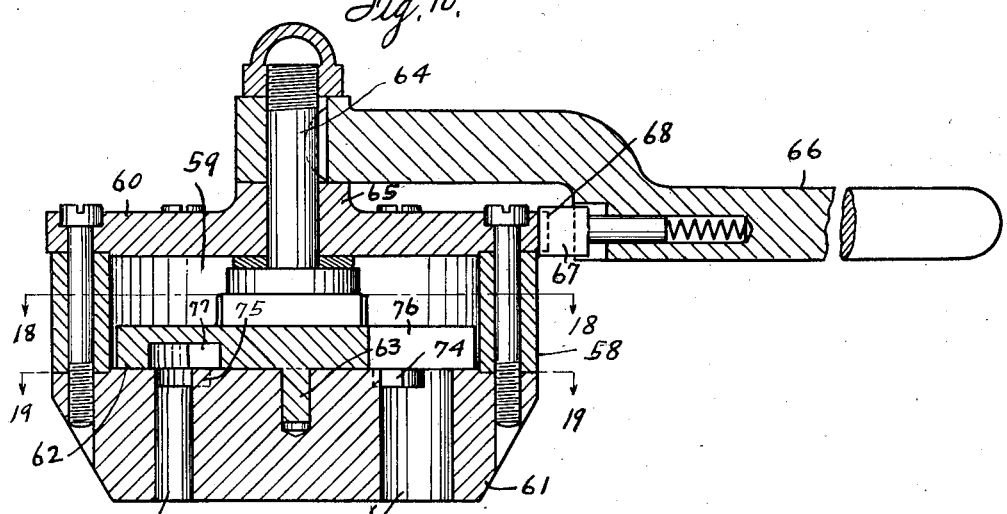
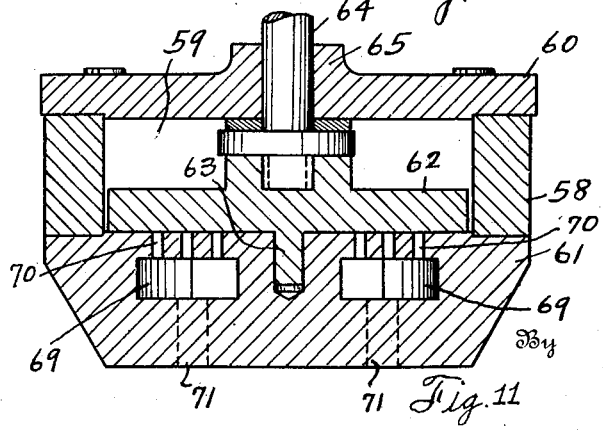

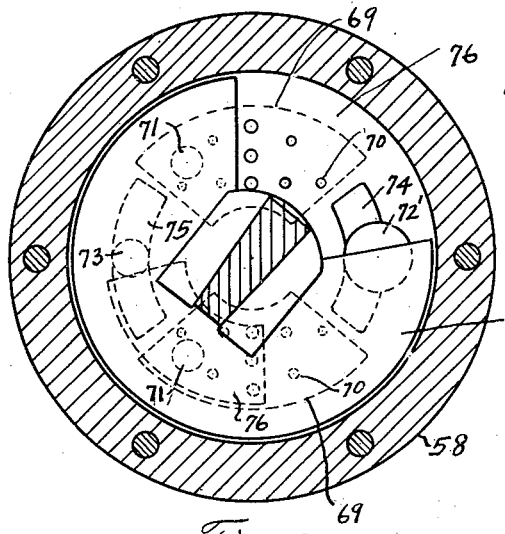
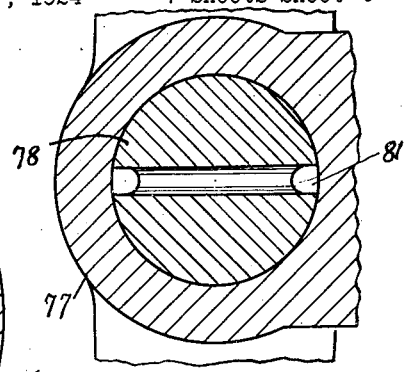
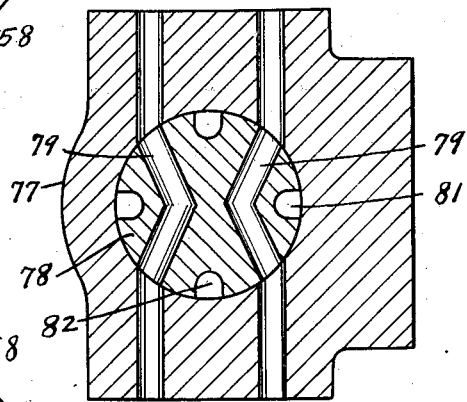
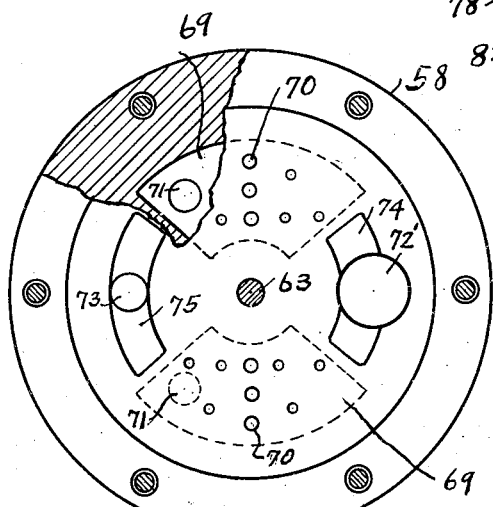
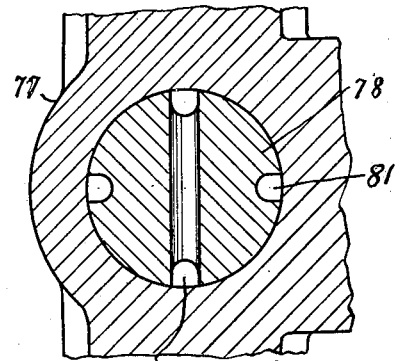

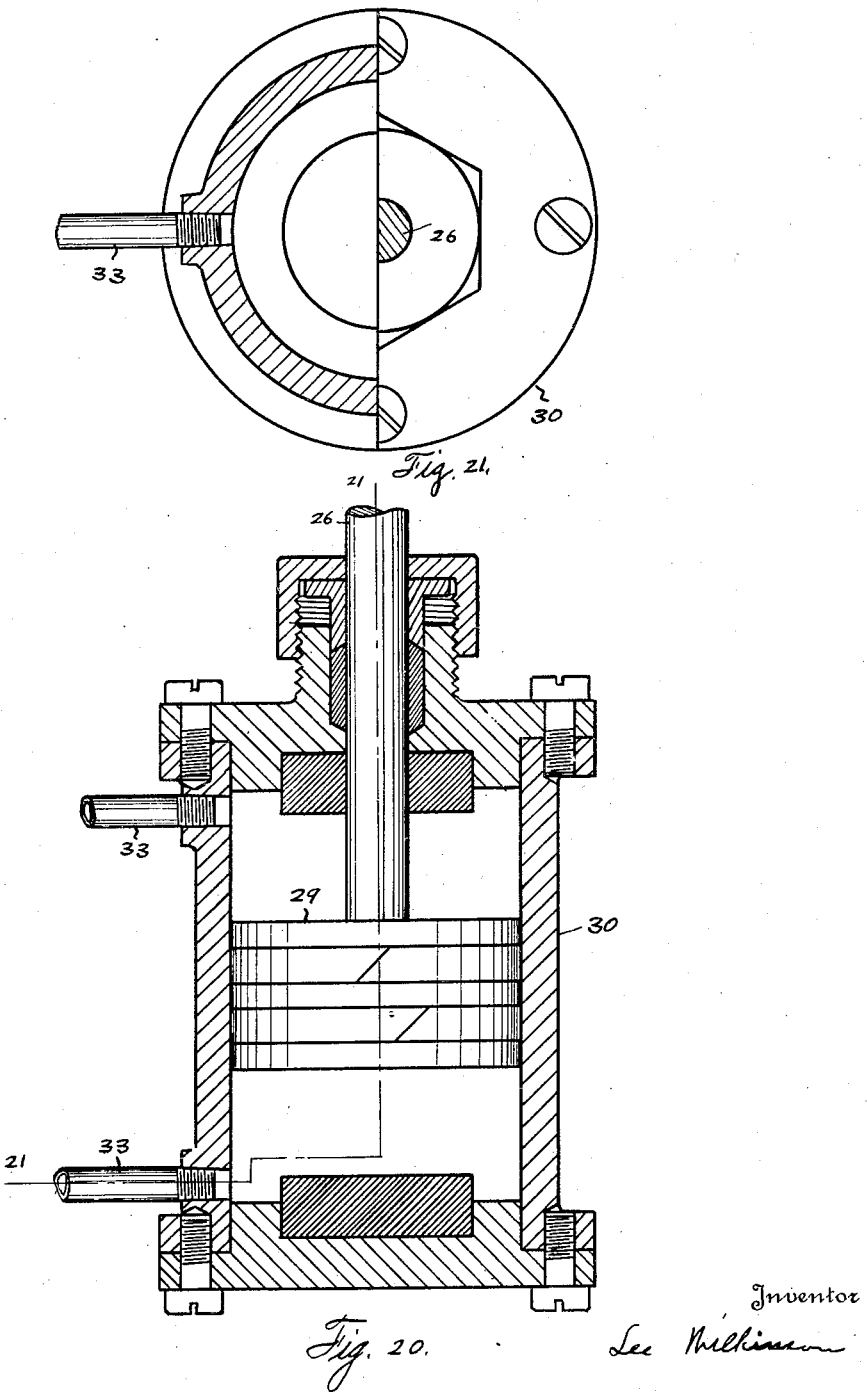

Patented Mar. 3, 1925.

1,528,139

UNITED STATES PATENT OFFICE.

LEE WILKINSON, OF SOUR LAKE, TEXAS.

DRAW WORKS.

Application filed March 17, 1924. Serial No. 699,750.

*To all whom it may concern:*

Be it known that I, LEE WILKINSON, a citizen of the United States, residing at Sour Lake, in the county of Hardin and State of Texas, have invented certain new and useful Improvements in a Draw Works, of which the following is a specification.

This invention relates to new and useful improvements in a draw works.

One object of the invention is to provide, in well drilling apparatus, a draw works which may be controlled in a novel manner by utilizing fluid pressure in the operation of the clutches and brakes embodied in the draw works, as now constructed.

Another object of the invention resides in the provision of a draw works equipped with the usual clutches and brakes, now in common use, and also equipped with means for applying fluid pressure to operate the clutches and brakes, and embodying also novel types of valves through which said fluid pressure may be controlled and applied.

With the above and other objects in view, the invention has particular relation to certain novel features of construction, operation, and arrangement of parts, an example of which is given in this specification and illustrated in the accompanying drawings, wherein:—

Figure 2 shows a plan view of the clutch controlling valve mechanism employed.

Figure 3 shows a side view thereof.

Figure 4 shows a bottom view thereof.

Figure 5 shows a vertical sectional view thereof.

Figure 6 shows a cross sectional view taken on the line 6—6 of Figure 3.

Figure 7 shows a cross sectional view on the line 7—7 of Figure 3.

Figure 8 shows a plan view of the valve embodied in said clutch controlling valve mechanism.

Figure 9 shows a side elevation of said valve.

Figure 10 shows a plan view of a brake controlling valve mechanism employed.

Figure 11 shows a vertical sectional view thereof taken on the line 11—11 of Figure 10.

Figure 12 shows a vertical sectional view taken at right angles to the view shown in Figure 11.

Figure 15 shows a cross sectional view thereof on the line 15—15 of Figure 14.

Figure 16 shows a cross sectional view thereof on the line 16—16 of Figure 14.

Figure 17 shows a cross sectional view thereof on the line 17—17 of Figure 14.

Figure 18 is a cross sectional view of the brake controlling valve taken on the line 18—18 of Figure 12.

Figure 19 is a cross sectional view thereof taken on the line 19—19 of Figure 12.

Figure 20 shows a longitudinal sectional view of one of the fluid pressure cylinders employed; and Figure 21 shows a sectional view thereof, taken on the line 21—21 of Figure 20.

Figure 1:
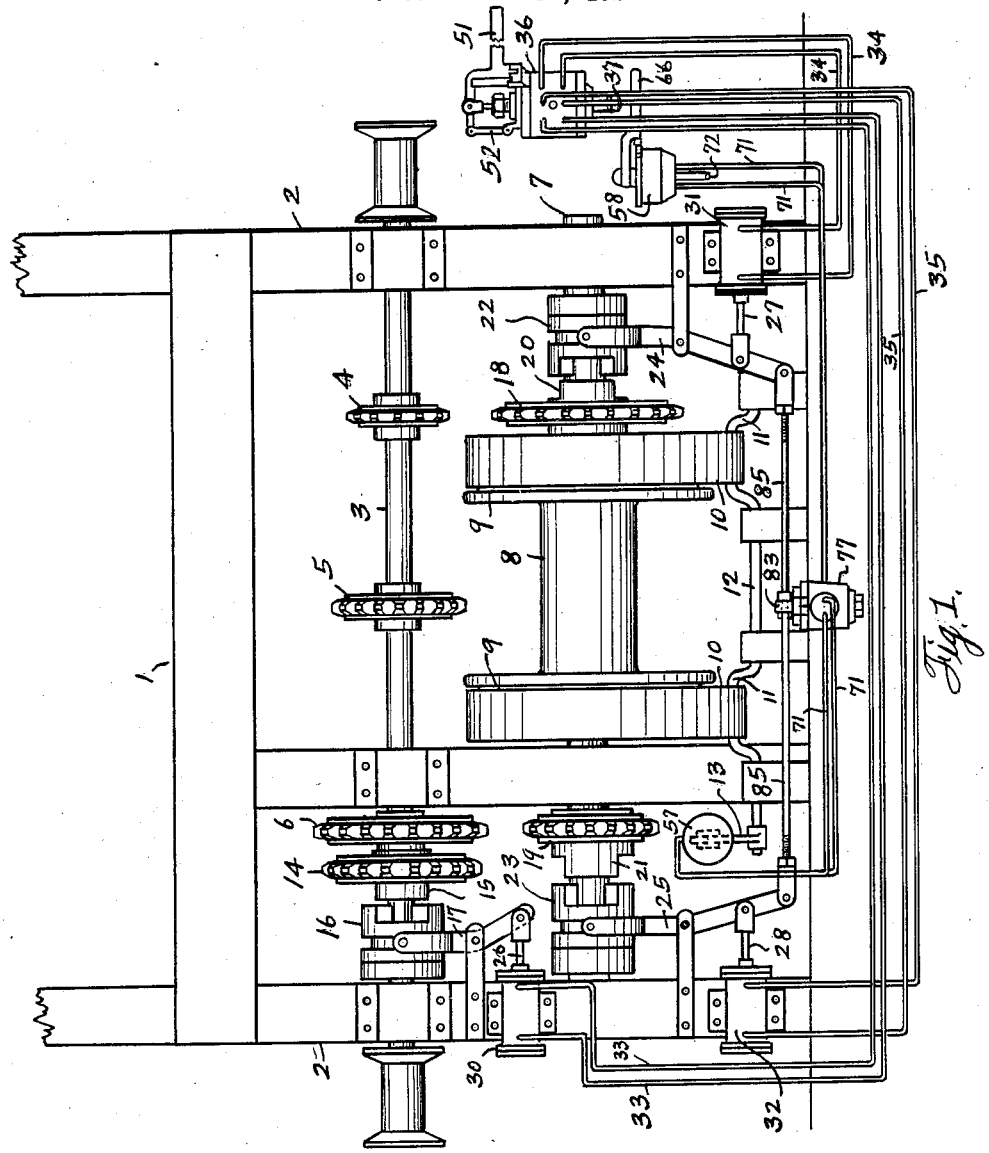
Figure 1 shows an elevation of the complete draw works equipped with the fluid pressure controlled apparatus.
Figure 13:
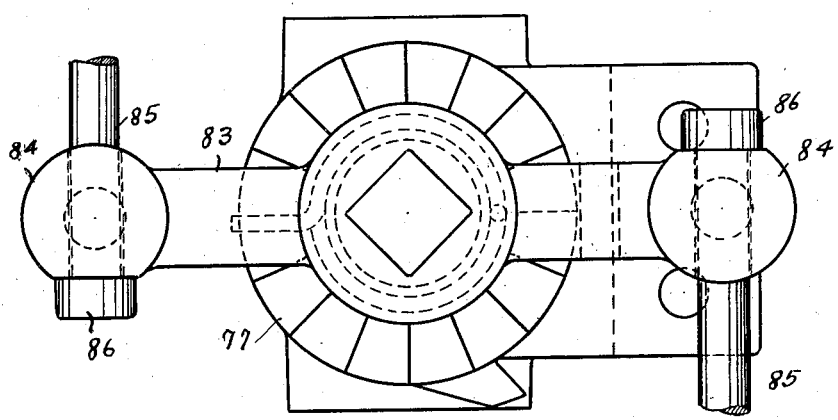
Figure 13 shows a plan view of a reversing valve mechanism employed.
Figure 14:
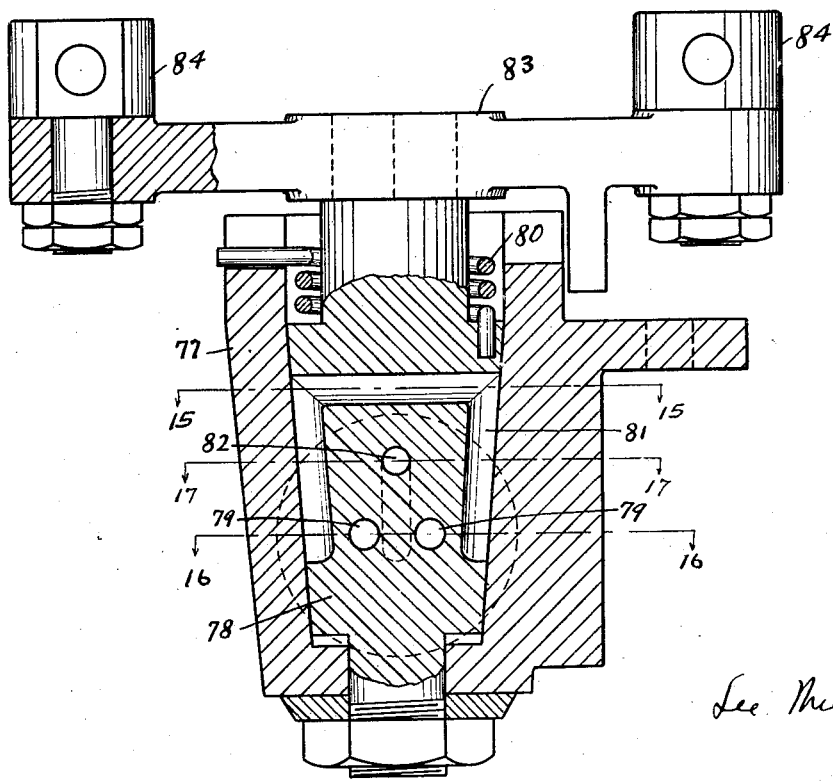
Figure 14 shows a vertical sectional view thereof.

Referring now more particularly to the drawings, wherein like numerals of reference designate similar parts in each of the figures, the numeral 1 designates the framework, as a whole, of the draw works, which includes the upright side beams 2, 2, spaced apart.

Rotatably mounted in suitable bearings, carried by the side beams there is a line shaft 3 which has the sprockets 4, 5, and 6, fixed thereon. The sprocket 5 is provided to drive said shaft through the medium of a suitable sprocket chain (not shown) which, in turn is driven in the usual way, from the engine or other power employed.

Mounted in the framework, there is also the rotatable drum shaft 7 which has the cable winding drum 8, fixed thereon, said drum having the end brake flanges 9, 9, formed integrally therewith. These flanges are surrounded by the usual brake bands 10, 10, each of which is permanently fixed, at one end, and whose other ends are connected to the offset wrists 11, 11, of the brake shaft 12 which is rotatable in suitable bearings carried by the framework. One end of the brake shaft carries a fixed arm 13, for a purpose hereinafter to be explained.

The line shaft also carries a loosely mounted sprocket wheel 14, the outer end of the hub of which is formed with a clutch jaw 15, and splined on said shaft is a jaw clutch member 16, with which the pivotally mounted shift arm 17 is connected.

The drum shaft 7 has the large and small sprocket wheels 18 and 19 loosely mounted thereon, the outer ends of the hubs of which are formed with clutch jaws 20 and 21, respectively. These sprocket wheels are aligned with the respective sprocket wheels 4 and 6, and are driven therefrom by suitable sprocket chains (not shown). Splined on the drum shaft 7, and adapted to be clutched with, and disengaged from the respective sprockets 18 and 19, are the clutches 22 and 23. There are the pivoted shift levers 24 and 25, which are connected, at one end, to the respective clutches 22 and 23. The outer, or free, ends of the shift levers 17, 24 and 25 are connected to the plunger rods 26, 27 and 28, respectively, of the plungers 29, which work in the respective cylinders 30, 31, and 32.

Respective pairs of pressure lines 33, 33; 34, 34; and 35, 35, lead from the valve casing 36, of the clutch controlling valve, and enter the respective cylinders 30, 31, and 32, on opposite sides of the plungers thereof, as illustrated in Figures 20 and 21.

The clutch controlling valve mechanism embodies the hollow cylindrical casing 36 with the inlet pressure line 37 entering the bottom thereof. Within the cylinder there is a close fitting valve 38 which is mounted on a valve rod 39. This rod has its lower end fitted through a suitable bearing in the lower end of the casing and the rod works through a stuffing box 40, carried by the upper end of the casing.

An intermediate section of the rod 39 is formed with a substantially square section which fits into a lateral slot 41, cut in the valve, and a coil spring surrounds the valve rod and is interposed between the top end of the casing and the valve. The valve rests on an annular rib 42, preferably formed integrally with the rod 39. The valve is somewhat shorter than the inside lengthwise diameter of the casing, and has a limited endwise movement therein.

The valve is cast substantially hollow so as to provide the channels 43, 43, therethrough it from end to end. The pressure fluid entering the casing will pass upwardly through the channels 43 to the chamber 47 in the casing, above the valve. The pressure lines 33, 33; 34, 34, and 35, 35 enter the casing 36 through the tapped holes 33', 33'; 34', 34', and 35', 35', respectively. The valve casing also has a relief, or outlet port 44. One side of the valve 38 has the counter sunk portions forming chambers 45 and 46, separated by a rib 48. The chambers 47 and 45, respectively, have the corresponding lengthwise channels 49 and 50.

There is an operating lever 51, connected at a rotatable anchor 58, carried by the upper end to the casing by means of the link 52. The opposite end of the lever is formed into a suitable hand grip and the upper end of the rod 39, is pivoted to said lever intermediate its ends. The lever 51 has a depending integral dog 53 adapted to engage with a notched segmental rack 54, formed on the corresponding side of the casing end. The valve may be rotated, as desired, by lifting the free end of the lever 51 to disengage the dog 53 from said rack, and, then swing the lever to rotate the valve, as desired.

The pressure through the lines 33, 34 and 35 may be controlled by this valve. For example, the valve may be turned to align the channels with the lines 33, 33 in which case pressure from the chamber 47 will enter one of said lines and the other line 33, will be connected into the relief chamber 45, which at all times is connected with the relief port 44. The result will be that pressure fluid will be admitted into the cylinder 30 on one side of the plunger 29, and the pressure on the other side of said plunger will be relieved. The clutch 16 will accordingly be operated. When the valve is shifted to another position the pressure through the lines 33 will be reversed, the one formerly connected with the channel 49 being connected into the relief chamber 45 and the one formerly connected with the relief chamber 45 being connected into the pressure chamber 46. Similarly pressure may be supplied through the lines 34, and 35 to the cylinders 31 and 32 on either side of the plunger thereof and relieved from the opposite side of said plunger in order to actuate the clutches 22 and 23. It is to be noted, as is apparent from an inspection of Figures 1, 3 and 5, that when any clutch is actuated into engaged position, the other clutches will be held in released position, all of the clutches may be released by elevating the valve 38 to highest position to connect the lines 33', 34', 35' with the relief port 44.

There is a cylinder 57 which is also provided with a plunger 29 having a plunger rod, similar to the rod 26. This plunger rod is connected to the free end of the arm 13, and through the operation of the plunger in the cylinder 57 the brake shaft 12 may be operated to set and release the brakes 10. The pressure in the cylinder 57 is applied and released through the brake valve mechanism shown in Figures 10, 11, 12, 18 and 19. This valve mechanism includes a valve casing 58, formed with an internal pressure chamber 59. The casing has a removable cover 60 and is formed with the valve seat 61. There is a disc-like valve 62, in the chamber 59 which co-operates with the seat 61. The valve 62 has a central depending stud 63 which fits into a central bearing in the valve seat and fastened to the valve there is a valve operating rod 64, which works through a central bearing 65, in the cover 60. Fastened to the upper end of the rod 64 there is a handle 66, by means of which the valve may be turned. The handle has a spring seated dog 67, adapted to engage in the notches of the segmental rack member 68, into which one side of the cover 60 is formed. Within the valve seat 61, there are the oppositely arranged arcuate chambers 69, 69, and leading from these chambers through the vlave seat there are the passageways 70, 70. The pressure lines 71, 71, lead from the chambers 69, 69, through the reversing valve shown in Figures 13 to 17, inclusive, and enter the cylinder 57 on opposite sides of the plunger therein. A pressure line 72 enters the chamber 59 through the port 72', seat 61, and a relief port 73 leads from said chamber, through said seat. The inner ends of the ports 72' and 73 terminate in arcuate countersunk channels 74 and 75 formed in the face of the valve seat and extending each way from said ports. The valve 62, has a segemental notch 76, cut in one side thereof and opposite said notch the valve has a countersunk chamber 77 in its underside.

The chamber 59 is always in communication with the pressure line 72' since the notch 76 always registers in part at least, with the channel 74, and consequently the fluid in said chamber 59 is always under pressure. When the valve is turned to bring the notch 74 into registration with the ports 70 of one of the chambers 69, the pressure fluid will pass through said ports and into and through the corresponding line 71 into one end of the cylinder 59, and pressure will be relieved from the other end of said cylinder through the other line 71, said relieved fluid passing into the chamber 76, and thence through the channel 75, with which said chamber 76 now registers, and out through the relief port 73. The pressure may be reversed by reversing the position of the valve 62, so as to bring the notch 76, into registration with the ports 70 of the other chamber 69, and to shift the relief chamber 76 out of registration with said last mentioned chamber 69, and into registration with the other one. The valve 62 may, however, be turned to neutral position, as shown in Figures 10 and 11, in which position the notch 76 is out of registration with the ports 70 of either pressure chamber 69 and pressure will be thus entirely cut off from the cylinder 57. When the clutches 22 and 23 are disengaged, the brakes may thus be applied or released directly by the operation of the brake valve mechanism above described.

In Figures 13 to 17, inclusive, I have shown a pressure reversing valve mechanism which will now be described:—The numeral 77 designates the casing of this mechanism into which the pressure lines 71, 71 are connected. In this casing there is fitted the rotary valve 78 which has a tapering fit in the casing, as shown, and the respective lines 71 have a continuous direct connection, through the bores 79, 79, through said valve. These bores are normally held in alignment with their rspective pressure lines 71, 71 by means of a coil spring 80 which is fitted into the casing end and surrounds the valve and has one end connected to said casing and the other end connected to the valve. The valve 78 also has the cross bores 81, and 82 at substantially right angles to each other. The valve may be turned to align the cross bores with opposite pressure lines 71, to in effect cross said lines. For example, the valve 78 may be turned so as to connect one of the lines 71 with the other through the cross bore 81, and similarly connect said lines through the cross bore 82.

The valve 78 carries a cross arm 83 whose ends have the swiveling bearings 84, 84. The free ends of the shift levers 24 and 25 have the rods 85, 85, hinged thereto at one end and their other ends slide loosely through the corresponding bearings 84 and are formed with heads 86, 86 adapted to engage with said bearings so that a pull exerted through either rod 85 will operate to turn the valve correspondingly.

When it is desired to drive the rotary pipe the rotary driving sprocket is clutched with the line shaft 3 by a suitable manipulation of the valve lever 51 so as to shift the clutch 16 into engagement. The other clutches 22 and 23 will be automatically disengaged, as hereinbefore explained and the brake valve mechanism will usually be shifted to applied position so that brakes will be in applied position, to hold the weight of the pipe being rotated.

In drilling operations the drum 8 is employed for pulling the string of pipe from and letting the same down into the bore and for lifting and handling other heavy objects. This drum is equipped with the two clutches 22 and 23, the former being what is known as the slow clutch utilized for handling heavy loads and the latter being known as the fast clutch for light loads where speed is desired.

In doing this work with the drum the brake valve mechanism may be operated to admit pressure to the cylinder 57 to apply the brakes. The clutch valve mechanism may now be operated to supply pressure to either cylinder 31 or 32, so as to engage either clutch 22 or 23 as desired. This will operate through the corresponding rod 85 to rotate the valve 78 so as to in effect cross the lines 71, 71, as hereinbefore explained, and release the brakes while either drum clutch is engaged. If it be desired to apply the brakes while either of said drum clutches is engaged this may be done by reversing the lever 66 of the brake valve mechanism.

The brake valve mechanism is of such construction that the pressure may be varied so as to fully or only partly apply the brakes. This is accomplished by moving the valve 62 to uncover only a sufficient number of the pressure ports 70 to obtain the required pressure, the greater number of parts uncovered, the greater the pressure in the cylinder 57 and vice versa.

What I claim is:—

1. In well drilling apparatus, draw works embodying driving members and driven members, clutches for operatively connecting the respective driving members with, and disconnecting them from, their corresponding driven members, means connected to the respective clutches to operate the same, mechanism adapted to apply fluid pressure to said means to operate either clutch into engaged position and simultaneously to hold the other clutches in released position at the will of the operator.

2. In well drilling apparatus, a draw works embodying a clutch for connecting and disconnecting a driving member and a driven member means adapted to be operated by fluid pressure, for operating said clutch into engaging or released position, a brake adapted to be applied to and released from said driven member, and a fluid pressure controlling mechanism through which said brake may be applied or released.

3. In well drilling apparatus, a draw works embodying a clutch for connecting and disconnecting a driving member and a driven member means adapted to be operated by fluid pressure, for operating said clutch into engaging or released position, a brake adapted to be applied to and released from said driven member, and a fluid pressure controlling mechanism through which said brake may be applied or released, said pressure controlling mechanism embodying a reversing valve structure adapted to automatically release the brake when the clutch is actuated into engaged position.

4. In well drilling apparatus, a draw works embodying a driving member and a driven member, a clutch through which said members may be operatively connected and disconnected, means through which fluid pressure may be applied to operate said clutch, a brake arranged to be applied to, and released from said driven member, brake controlling means through which fluid pressure may be employed to apply or release the brake.

5. In well drilling apparatus, a draw works embodying a driving member and a driven member, a clutch through which said members may be operatively connected and disconnected, means through which fluid pressure may be applied to operate said clutch, a brake arranged to be applied to, and released from said driven member, brake controlling means through which fluid pressure may be employed to apply or release the brake, and an automatically operated reversing valve mechanism arranged to be operated by the clutch operating means to reverse the application of fluid pressure to the brake controlling means.

6. In well drilling apparatus, a draw works embodying a driving member and a driven member, a clutch through which said members may be operatively connected and disconnected, a fluid pressure cylinder, clutch operating means adapted to be actuated by fluid pressure in said cylinder, means for controlling the application of pressure in said cylinder to said operating means to engage or disengage the clutch, a brake arranged to be applied to and released from, said driven member, brake controlling means through which fluid pressure may be employed to apply or release the brake.

7. In well drilling apparatus, a draw works embodying a driving member and a driven member, a clutch through which said members may be operatively connected and disconnected, a fluid pressure cylinder, clutch operating means adapted to be actuated by fluid pressure in said cylinder, means for controlling the application of pressure in said cylinder to said operating means to engage or disengage the clutch, a brake arranged to be applied to and released from, said driven member, brake controlling means through which fluid pressure may be employed to apply or release the brake, and a pressure reversing mechanism arranged to be operated by the clutch operating means to automatically reverse the application of fluid pressure to the brake controlling means.

8. In well drilling apparatus, a draw works embodying driving members and driven members, clutches through which said driving members may be operatively connected with and disengaged from the corresponding driven members, fluid pressure cylinders, clutch operating means adapted to be actuated by fluid pressure in the respective cylinders, means for controlling the application of fluid pressure in the respective cylinders to the respective clutch operating means to operate one of said clutches into either of said positions and simultaneously to operate the other clutches into the reverse position.

9. In well drilling apparatus, a draw works embodying driving members and driven members, clutches through which said driving members may be operatively connected with and disengaged from the corresponding driven members, fluid pressure cylinders, clutch operating means adapted to be actuated by fluid pressure in the respective cylinders, means for controlling the application of fluid pressure in the respective cylinders to the respective clutch operating means to operate one of said clutches into either of said positions and simultaneously to operate the other clutches into the reverse position, a brake arranged to be applied to, and released from, one of the driven members, brake controlling means through which fluid pressure may be employed to apply or release the brake.

10. In a well drilling apparatus, a draw works embodying the driving members and driven members, clutches through which said driving members may be operatively connected with and disengaged from the corresponding driven members, fluid pressure cylinders, clutch operating means adapted to be actuated by fluid pressure in the respective cylinders, means for controlling the application of fluid pressure in the respective cylinders to the respective clutch operating means to operate one of said clutches into either of said positions and simultaneously to operate the other clutches into the reverse position, a brake arrangement to be applied and released from, one of the driven members, brake controlling means through which fluid pressure may be employed to apply or release the brake, and a pressure reversing mechanism arranged to be operated by the operating means of the clutch associated with said last named driven member to automatically reverse the application of fluid pressure to said brake controlling means.

11. A pressure controlling mechanism including a casing having a pressure fluid inlet port and a relief port, a plurality of pairs of fluid pressure lines entering the casing, a rotary valve in the casing capable of endwise movement therein and forming a pressure chamber between the valve and the casing end, said valve being formed with a channel leading from said chamber, said valve also having a relief chamber which communicates with said relief port, and a channel leading from said relief chamber, and means for shifting the valve to communicate said channels with the respective lines of either pair of fluid pressure lines.

12. A fluid pressure reversing mechanism including a casing, pressure lines leading through the casing, a rotary valve in the casing formed with a plurality of bores which form continuations of said lines, and means for rotating said valve to align selected bores with the respective lines.

13. A fluid pressure reversing mechanism including a casing, a pair of fluid pressure lines leading through the casing, a rotary valve in the casing and provided with bores through which the fluid pressure may pass directly through said lines, said valve being provided with other bores adapted to be brought into registration with both of said lines and through which the pressure fluid passing through one line will be conducted into the other line.

14. A fluid pressure reversing mechanism including a casing, a pair of fluid pressure lines leading through the casing, a rotary valve in the casing and provided with bores through which the fluid pressure may pass directly through said lines, said valve being provided with other bores adapted to be brought into registration with both of said lines and through which the pressure fluid passing through one line will be conducted into the other line, and means for rotating said valve.

15. A fluid pressure controlling valve mechanism including a valve casing formed with a seat having a pressure fluid inlet port and a relief port, pressure lines entering the casing, a rotary valve cooperating with the seat and having a cut away portion provided to permit communication between the inlet port and one of said lines when said valve is moved to a predetermined position, said valve having a channel connecting the other line with the relief port when said valve is in said position.

16. A fluid pressure controlling valve mechanism including a valve casing formed with a seat having a pressure fluid inlet port and a relief port, pressure lines entering the casing, a rotary valve cooperating with the seat and having a cut away portion provided to permit communication between the inlet port and one of said lines when said valve is moved to a predetermined position, said valve having a channel connecting the other line with the relief port when said valve is in said position, and means for rotating the valve.

In testimony whereof I have signed my name to this specification in the presence of two subscribing witnesses.

LEE WILKINSON.

Witnesses:
E. V. HARDWAY,
JOHN WM. PALMER.